July 12, 1960  E. HOERNER  2,944,630
AIR LINE FILTER AND AUTOMATIC DRAIN VALVE
Filed Feb. 2, 1952
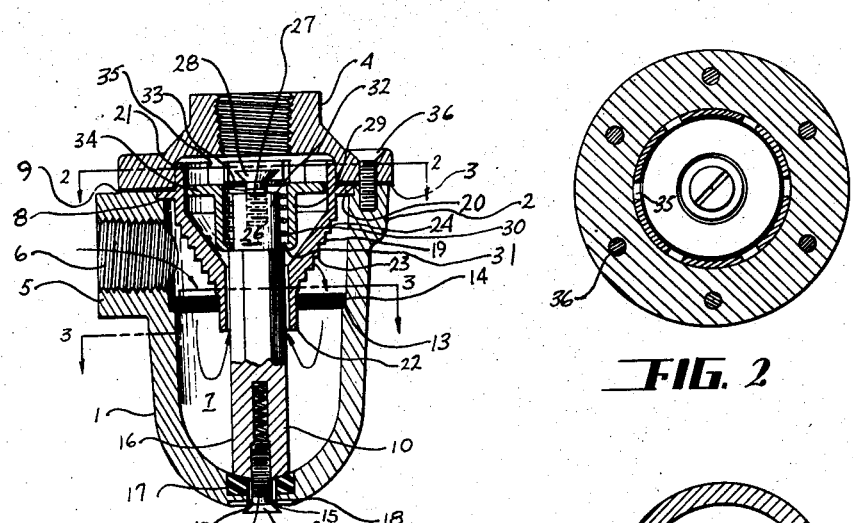
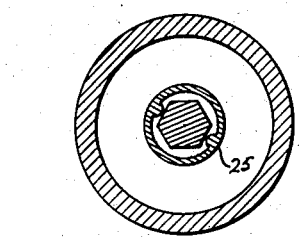
FIG. 1
FIG. 2
FIG. 3
INVENTOR
ERIC HOERNER
HIS ATTORNEY United States Patent Office 2,944,630
Patented July 12, 1960

2,944,630
AIR LINE FILTER AND AUTOMATIC DRAIN VALVE

Eric Hoerner, P.O. Box 55, Dayton 1, Ohio

Filed Feb. 2, 1952, Ser. No. 269,651

4 Claims. (Cl. 183—42)

This invention relates to drains and has for its object to provide a drain which has a capacity of from 0 to 65 c.f.m., that will operate at a pressure from 5 to 300 pounds per square inch, and functions automatically on an intermittent flow of air to any air tool or spray gun, or any other air operated equipment.

It is the object of this invention to provide a drain supported in an upright position by connecting the drain to an air supply line and connecting the air hose to the top outlet opening of the drain, the other end of said hose is connected to any air equipment.

It is also an object of this invention to provide a drain that may be easily attached to and removed from parts with which it is operated.

It is also an object of this invention to provide a drain which may be from time to time cleaned by removing a few screws from the cap and one in the bottom of the unit.

These and other advantages will appear in the following description taken in connection with the drawings, in which:

Figure 1 is a vertical section through the drain.
Figure 2 is a section on line 2—2 of Figure 1.
Figure 3 is a section on line 3—3 of Figure 1.

The main body of the drain consists of a cup shaped body member 1, enlarged at its upper end 2, for the purpose of forming a seat 3 for a lid 4. Extending from one side of the cup shaped body member is a lateral boss 5, which has therein a threaded hole 6, for receiving a pipe. The bottom of the cup shaped body member forms a well 7. On the inside of the cup shaped body member above the well 7 is an annular seat 8. Between the top of the cup shaped body member and the lid is a gasket 9 made of rubber or any other suitable material.

Vertically arranged in the cup shaped body member is a stem 10 which has threaded in its lower end a screw 11 with a valve head 12, thereon.

On the inside of the body member 1 below the hole 6 is a shoulder 13 which supports an annular filter member 14 made of any suitable material, preferably porous ceramic or powdered metal material.

In the bottom of the well 7 beneath the stem 10 is a hole 15, which has around it an annular seat 17 for the lower end of the stem 10, which acts as a valve to close the hole 15. On the outside of the bottom of the well is another seat 18 in which the head 12 of the screw 11 fits for closing the passageway through the hole and the washer at certain periods in the operation of the drain. In the body member there is a tubular baffle 19 which has on its upper enlarged end 21 a circular flange 20 for engagement with the annular seat 8, for supporting the baffle. The lower end of the baffle is smaller as indicated by numeral 22 and fits within and is partly supported by the filter 14. Between the upper part 21 and the lower part 22 of the baffle is a cone shaped part 23 which is directly adjacent the inlet opening or hole 6. On this conical part of the baffle is a plurality of sets of horizontal ribs 24. Each set of ribs extend about one fourth of the way around the baffle. On the inside of the part 22 of the baffle is a pair of vertically disposed ribs 25 which engage the sides of the hexangular part of the stem 10 to prevent the rotation of the stem. The upper part of the stem 10 is round as indicated by numeral 26 and has threaded therein an axially disposed screw 27 which has on its end a screw head 28. Fitting in the upper end of the baffle and around the round part of the stem 10 is what you might call a piston member, which has a cup shaped part 29 with an opening 30 therein for the circular part of the stem. Thus formed the piston member has on its lower end a ledge 31 on which is supported a spring 32. The spring at its lower end rests upon said ledge and at its upper end engages a washer 33 on the screw 27. The tension of the spring may be varied by the rotation of the screw 27. On the upper end of the piston member is a flange 34 which is circular shaped and fits closely within the enlarged part of the baffle. The upper edge of the baffle has therein a plurality of notches 35 through which air may pass from the body member to and through the outlet when the piston member is forced up due to air pressure, there is thereby furnished an automatic air volume control.

The upper part of the body member is closed by means of the lid 4. This lid is hollowed out to form a cavity around which there is a circular projection which rests upon the top of the body member. The part of the baffle that extends into the lid fits the lid closely so that it is substantially air tight. When the piston member is in a position as shown in Figure 1 the passageway from the body member into the outlet is cut off. When sufficient pressure is brought upon the piston member the piston member moves upward thereby opening a connection from the upper part of the body member into the outlet so that air will escape. The cap or lid is held upon the body member by means of screws 36.

The drain is supported by means of a pipe threaded into the inlet opening or hole 6. The outlet is connected to a hose which directs air into any instrumentality desired.

The air passes into the body through the opening 6 and contacts the baffle as soon as it enters into the interior of the body. The air will pass around the baffle and through the filter into the lower part of the body or well 7. The air is thus separated from any vapor or foreign matter that may be therein. From the well 7 the clean and purified air passes up through the lower part of the baffle and around the stem 10. When the air reaches the upper enlarged part of the baffle, it contacts the piston member located on the upper end of the stem 10 and forces the piston member up carrying with it the stem 10. The initial movement of the piston member and the stem causes the hole 15 in the lower part of the well to be opened for the escape of moisture and the notches 35 to be partly open thereby giving an outlet to air from the body. On the first movement of the stem the valve at the lower end of the body is opened to discharge the moisture and the piston member is moved up partly whereby the notches 35 are partly opened for discharge of air. The collected moisture in the lower part of the well will escape through the hole 15 in the bottom of the well, while the air will pass through the outlet. A further application of air pressure cannot further raise the stem due to the action of the screw head as a valve. A further increase of air pressure will cause the piston member to move further against the operation of the spring around the upper end of the stem. This upward movement of the piston member further opens the notches 35 thereby increasing the output of the air. When the air flow is cut off the piston member moves down thereby permitting the downward movement of the stem 10 and the opening of the hole 15 whereby there is again a discharge of moisture until the stem 10 rests upon the lower end of the well to close hole 15.

The piston member has two movements. It first moves up with the stem 10, while the hole 15 is being opened. This movement continues until the hole 15 is closed by the head 12 of the screw 11. After the hole 15 is closed the stem 10 cannot move any further. The second movement of the piston member is after the closing of the hole 15, when the piston member is forced upward against the operation of the spring around the upper end of the stem 10. During the first movement of the piston member the notches 35 are partly opened for the exit of the air. The final movement of the piston member takes place against the spring and results in the final and complete opening of the notches 35.

The longitudinal or vertical movement of the stem 10 is regulated by the screw 11. The longer the distance between the stem 10 and the head of the screw the longer is the movement of the stem, and the greater the time for the discharge of moisture.

Figure 1 shows the drain in its inactive position. In this position the lower end of the stem 10 rests upon the seat 17, closing the hole 15. When the outlet is open the air rushes in and forces the stem up opening the hole 15 for the discharge of water and other materials. This discharge continues until the head of the screw 12 rests upon its seat thereby closing the hole 15. As the stem moves up, the notches 35 are opened so that the air can pass out through the outlet. This action continues until the outlet is closed and the flow of air is stopped. When this takes place there is more or less a state of equilibrium in the drain cases and the stem 10 will drop and close the outlet 15.

What I claim is:

1. In a drain, a cup-shaped body member having an air inlet, a drain outlet and an annular seat, a tubular baffle in the body member, said baffle having a flange resting on the seat and notches adjacent the flange, a lid having an air outlet, said lid resting on the body member and on the flange on the seat and fitting closely around the notched part of the baffle, a stem in the baffle, said stem having on one end a valve structure to open and close the drain outlet, and on its other end a cup-shaped piston member having a flange fitting in the baffle adjacent the notches to open and close the notches to form passageways through the notches for the passage of air to the air outlet.

2. In a drain, a cup-shaped body having an air inlet and a drain outlet, an annular filter across the cup member between the air inlet and the drain outlet, a baffle having a part in the filter, a flange on the top of the body and a notched edge extending from the flange, a lid on the body having a part resting on the body and around the notched edge, said lid having an air outlet, a stem in the baffle extending from the drain outlet toward the air outlet, a piston on the stem, said piston cooperating with the notched part of the baffle to produce air outlets.

3. In a drain, a body having an air inlet, an air outlet, and an annular baffle forming part of an air passageway from the air inlet to the air outlet and having an enlarged part, a smaller part, an intermediate conical part, a supporting flange on the enlarged part below its top edge, and air outlet notches in the edge of the baffle, a stem movable back and forth in the baffle and acting with the baffle to form a valve to open and close the drain outlet, and a piston resiliently and adjustably mounted on the stem, said piston having thereon a flange moving in the enlarged part of the baffle to open and close the notches therein to open and close the air outlet.

4. In a drain, a body having an air inlet, an air outlet, and an annular baffle forming part of an air passageway from the air inlet to the air outlet and having a supporting flange below its top edge, and air outlet notches in the edge of the baffle, a stem movable back and forth in the baffle and acting with the baffle to form a valve to open and close the drain outlet, and a piston resiliently and adjustably mounted on the stem, said piston having thereon a flange moving in the baffle to open and close the notches therein to open and close the air outlet.

References Cited in the file of this patent

UNITED STATES PATENTS

| | | |
|---|---|---|
| 1,680,288 | Gottschalk | Aug. 14, 1928 |
| 1,766,666 | Meyer | June 24, 1930 |
| 1,854,010 | Woodford | Apr. 12, 1932 |
| 2,007,358 | Anger | July 9, 1935 |
| 2,058,189 | Stuard | Oct. 20, 1936 |
| 2,406,214 | Garnier | Aug. 20, 1946 |
| 2,418,440 | White et al. | Apr. 1, 1947 |
| 2,487,876 | Johnson | Nov. 15, 1949 |
| 2,509,505 | Johnson | May 30, 1950 |
| 2,602,462 | Barrett | July 8, 1952 |